US012562564B2

(12) United States Patent
Lindell et al.

(10) Patent No.: US 12,562,564 B2
(45) Date of Patent: Feb. 24, 2026

(54) REDUCING INRUSH CURRENT TO A CAPACITOR BANK

(71) Applicant: ABB Schweiz AG, Baden (CH)

(72) Inventors: Elisabeth Lindell, Västerås (SE); Andrea Bianco, Sesto San Giovanni (IT); Stefan Halén, Västerås (SE); Carlo Taborelli, Venegono Inferiore (IT)

(73) Assignee: ABB Schweiz AG, Baden (CH)

( * ) Notice: Subject to any disclaimer, the term of this patent is extended or adjusted under 35 U.S.C. 154(b) by 162 days.

(21) Appl. No.: 18/534,998

(22) Filed: Dec. 11, 2023

(65) Prior Publication Data

US 2024/0213764 A1 Jun. 27, 2024

(30) Foreign Application Priority Data

Dec. 22, 2022 (EP) ..................................... 22216194

(51) Int. Cl.
*H02H 7/16* (2006.01)
*H02H 1/04* (2006.01)
*H02H 9/00* (2006.01)

(52) U.S. Cl.
CPC .............. *H02H 7/16* (2013.01); *H02H 1/043* (2013.01); *H02H 9/001* (2013.01)

(58) Field of Classification Search
CPC ........... H02H 7/16; H02H 1/043; H02H 9/001
See application file for complete search history.

(56) References Cited

U.S. PATENT DOCUMENTS 5,654,625 A 8/1997 Konstanzer et al.
6,172,863 B1 1/2001 Ito et al.

6,392,390 B1 5/2002 Ito et al.
2007/0253124 A1 11/2007 Zhou et al.
2013/0300215 A1* 11/2013 Koshizuka ............. H01H 9/563
307/130
2019/0371542 A1* 12/2019 Lindell .................. H01H 33/60

FOREIGN PATENT DOCUMENTS

DE 19639064 A1 3/1998
DE 19803775 C1 7/1999
EP 222727 B1 7/1989
EP 3230998 B1 12/2018
WO 0150561 A1 7/2001
WO WO-2016092015 A1 * 6/2016 ........... H01H 33/593

OTHER PUBLICATIONS

Machine translation of WO2016092015 by Clarivate Analytics, Jul. 2025, 11 pages.*
Extended European Search Report; Application No. 22216194.5; Completed: May 31, 2023; Mailed: Jun. 12, 2023; 8 Pages.

* cited by examiner

*Primary Examiner* — Harry R Behm
(74) *Attorney, Agent, or Firm* — Whitmyer IP Group LLC

(57) ABSTRACT

A method for reducing inrush current to an ungrounded capacitor bank when re-closing a switching device. The method includes opening the switching device, including breaking the current of a first phase of the three phases, and after a predetermined opening time period simultaneously breaking the currents of a second phase and a third phase of the three phases. The method also includes re-closing the switching device, including simultaneously making the respective currents of the second and third phases, and after a predetermined closing time period making the current of the first phase.

17 Claims, 5 Drawing Sheets

U$_{CT}$

U$_{CS}$

U$_{CR}$ s

U$_R$     U$_S$     U$_T$

U$_{CT}$

U$_{CS}$

U$_{CR}$ s

REDUCING INRUSH CURRENT TO A CAPACITOR BANK

TECHNICAL FIELD

The present disclosure relates to reducing inrush current to an ungrounded capacitor bank when re-closing a switching device arranged between an AC voltage source and the capacitor bank in an electrical three-phase system.

BACKGROUND

When energizing capacitor banks, an inrush current will occur with a magnitude that depends on the closing angle at which energization occurs. Optimal closing angles can be found, in relation to the system voltages, to minimize the inrush current if the initial state of the capacitor bank is that it is fully discharged, e.g. 5 minutes after the capacitor bank being disconnected. If the bank is ungrounded, any two of the circuit breaker poles are closed first, when the corresponding line-to-line voltage is zero, and the third pole is closed one quarter of a period later.

However, if the capacitor bank has just recently been disconnected, it will still be fully charged, or partially charged, depending on how long time has elapsed since the disconnecting. When re-connecting the capacitor bank before it has been fully discharged, minimizing the inrush current is not achieved by the same closing sequence as when the capacitor bank is fully discharged.

The present invention relates to reducing inrush current to an ungrounded capacitor bank also when re-connecting of the capacitor bank is done before it has been fully discharged.

SUMMARY

According to an aspect of the present invention, there is provided a method for reducing inrush current to an ungrounded capacitor bank when re-closing a switching device arranged between an AC voltage source and the capacitor bank in an electrical three-phase system. The method comprises opening the switching device by an opening sequence. The opening sequence comprises breaking the current of a first phase of the three phases, and after a predetermined opening time period starting at the breaking of the first phase, simultaneously breaking the current of a second phase of the three phases and the current of a third phase of the three phases. The method also comprises, following the opening, closing the switching device, by a closing sequence. The closing sequence comprises simultaneously making the respective currents of the second and third phases, and after a predetermined closing time period starting at the making of the second and third phases, making the current of the first phase. The predetermined opening time period corresponds to a $1/4+m$ period or a $3/4+m$ period of a voltage waveform of anyone of the three phases, where m is an integer of at least zero, preferably zero. If the predetermined opening time period corresponds to a $1/4+m$ period, the predetermined closing time period corresponds to a $3/4+n$ period of the voltage waveform. If the predetermined opening time period corresponds to a $3/4+m$ period, the predetermined closing time period corresponds to a $1/4+n$ period of the voltage waveform. n is an integer of at least zero, preferably zero.

According to another aspect of the present invention, there is provided a computer program product comprising computer-executable components for causing a controller to perform an embodiment of the method of the present disclosure when the computer-executable components are run on processing circuitry comprised in the controller.

According to another aspect of the present invention, there is provided a controller for a switching device. The controller comprises processing circuitry, and storage storing instructions executable by said processing circuitry whereby said controller is operative to perform an embodiment of the method of the present disclosure.

According to another aspect of the present invention, there is provided an electrical three-phase system comprising an embodiment of the controller of the present disclosure, the switching device, and the capacitor bank.

When re-closing the switching device, the two phases which were opened last are closed first, before closing the phase which was opened first. It has now been realized that the inrush current may be reduced even when the capacitor bank has not yet fully discharged after the opening of the switching device. According to the invention, this is achieved by using a specific predetermined closing time period between the making of the second and third phases and the making of the first phase. This predetermined closing time period depends on the predetermined opening time period.

Further modifications of the closing sequence may be made depending on whether the capacitor bank is still approximately fully charged at the time of re-closing of the switching device, or if it is partially discharged, i.e. somewhere between fully charged and fully discharged during discharging. If re-closing of the switching device occurs when the capacitor bank is still fully charged, e.g. within one second of opening the switching device, the polarity of the phases at re-closing may be important. In that case, if the opening time period was $1/4+m$ period, the making of the second and third phases preferably occurs at a positive zero-crossing in the voltage waveform of the first phase if the breaking of the first phase occurred at the minimum in its voltage waveform, or at a negative zero-crossing in the voltage waveform if the breaking of the first phase occurred at the maximum in its voltage waveform. In contrast, if the opening time period was $3/4+m$ period, the making of the second and third phases preferably occurs at a negative zero-crossing in the voltage waveform of the first phase if the breaking of the first phase occurred at the minimum in its voltage waveform, or at a positive zero-crossing in the voltage waveform if the breaking of the first phase occurred at the maximum in its voltage waveform. Otherwise, if the capacitor bank is partially discharged, e.g. within a time range of 1 to 300 seconds, such as 10-250 seconds, of opening the switching device, the making of the second and third phases preferably occurs when a voltage across the switching device for the second phase is the same as a voltage across the switching device for the third phase.

How to achieve making or breaking of a current at a specific time or position in a voltage waveform is generally well known, and may include monitoring a voltage waveform in at least one of the phases between the switching device and the voltage source.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
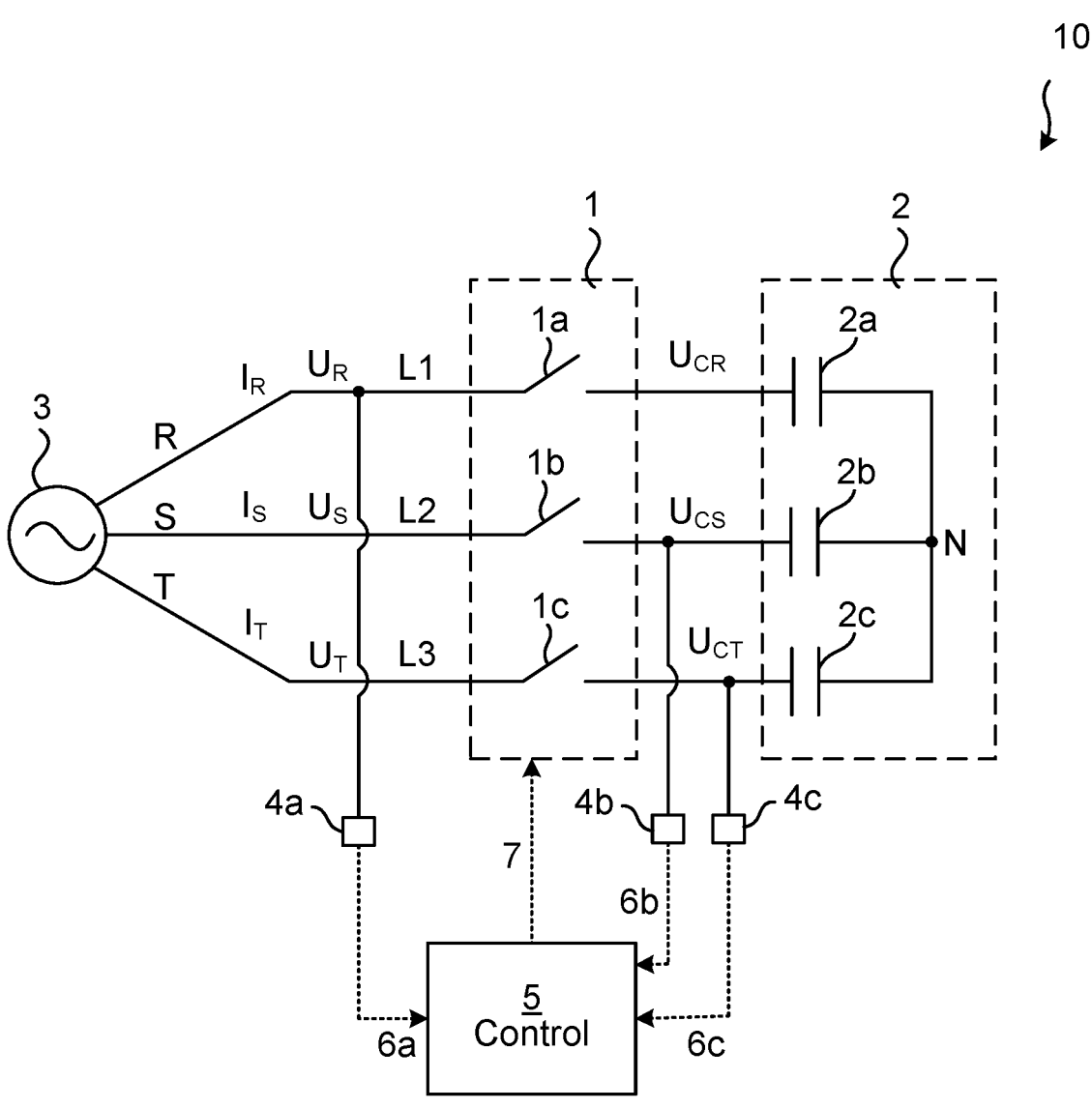
FIG. 1 is a schematic wiring diagram of an electrical three-phase system, in accordance with some embodiments of the present invention.

FIG. 1 illustrates a three-phase electric system 10 comprising an ungrounded (floating) capacitor bank 2 connected to an Alternating Current (AC) three-phase voltage source 3, e.g. a transmission or distribution grid, via a switching device 1. The system 10 comprises first, second and third phases R, S and T conducted in a respective first, second and third line L1, L2 and L3. The switching device 1 comprises a first switch 1a which when opened breaks, and when closed makes, the current $I_R$ in the first phase R, a second switch 1b which when opened breaks, and when closed makes, the current Is in the second phase S, and a third switch 1c which when opened breaks, and when closed makes, the current IT in the third phase T. The capacitor bank 2 may comprise at least one first capacitor 2a connected on the first line L1 of the first phase R, at least one second capacitor 2b connected on the second line L2 of the second phase S, and at least one third capacitor 2c connected on the third line L3 of the third phase T. Conveniently, the capacitor bank 2 may have a star configuration, as in the figure, with a neutral point N, but another configuration, e.g. a delta configuration, may also be contemplated in some embodiments. A respective grid-side phase-to-ground voltage, or voltage waveform, $U_R$, $U_S$ and $U_T$ in each phase R, S and T is present between the switching device 1 and the voltage source 3, while a respective capacitor-side voltage, or voltage waveform, $U_{CR}$, $U_{CS}$ and $U_{CT}$ in each phase R, S and T is present between the switching device 1 and the capacitor bank 2.

When the switching device 1 is being opened, each of the first, second and third switches 1a, 1b and 1c is moved from a closed position, conducting phase current, to an open position, not conducting phase current, breaking the respective currents $I_R$, $I_S$ and $I_T$ in the phases R, S and T. As a switch 1a, 1b or 1c is moved from its closed position to its open position, a pair of contacts separate from each other by an increasing distance, whereby arcing may occur between the contacts during a transition period until the arc is extinguished and the current is broken (i.e. interrupted). Thus, "breaking" of the current, as used herein, refers to when the conducting of the current ceases, e.g. when an arc is extinguished. Typically, the current of a phase is broken at or close to a (positive or negative) zero crossing of the current waveform, corresponding to a maximum or minimum of the voltage waveform, regardless of when the contacts start separating, but conveniently contact separation may start about one quarter period prior to the breaking of the current.

Similarly, when the switching device 1 is being closed, each of the first, second and third switches 1a, 1b and 1c is moved from the open position, not conducting phase current, to the closed position, conducting phase current, making the respective currents $I_R$, $I_S$ and $I_T$ in the phases R, S and T. As a switch 1a, 1b or 1c is moved from its open position to its closed position, a pair of contacts move towards each other until physically contacting each other, whereby arcing may occur between the contacts during a transition period until the physical contact. Thus, "making" of the current, as used herein, refers to when the conducting of the current resumes, e.g. when arcing (also called pre-arcing) starts between the contacts. However, it is well known in the art how to make or break a current.

There may be no need to monitor the actual voltage or current waveforms to determine the opening and/or closing time periods since the nominal frequency (e.g. 50 or 60 Hz) and phase shift (120°) of the voltage source 3 is typically known. Thus, time periods such as 1/4 period or 3/4 period are known.

However, to facilitate breaking or making the phase currents in accordance with the desired opening or closing sequence, it may anyway be convenient to monitor the grid-side voltage waveform $U_R$, $U_S$ or $U_T$, typically phase-to-ground voltage, of at least one of the phases R, S and T. Since the phase shift, typically 120°, is known, it is usually enough to monitor the voltage waveform of only one of the phases, since the voltage waveforms of the other two phases are implied. Thus, the system 10 may comprise a first voltage sensor 4a configured to monitor the grid-side voltage waveform $U_R$, $U_S$ or $U_T$, of one of the phases R, S and T, herein a first phase.

As mentioned above, in some embodiments of the present invention, it is desirable to make the currents of the second and third phases when the voltage $U_S$-$U_{CS}$ across the switching device 1b for the second phase S is the same as the voltage $U_T$-$U_{CT}$ across the switching device 1c for the third phase T. Thus, the system 10 may comprise a second voltage sensor 4b for monitoring of the capacitor-side voltage waveform $U_{CS}$ of the second phase S and a third voltage sensor 4c for monitoring of the capacitor-side voltage waveform $U_{CT}$ of the third phase T. Since, as discussed above, it is enough to monitor one of the grid-side voltage waveforms $U_R$, $U_S$ or $U_T$ to implicitly know all of them, all grid-side and capacitor-side voltage waveforms $U_R$, $U_S$ and $U_T$, and $U_{CR}$, $U_{CS}$ and $U_{CT}$ can be known from monitoring one grid-side voltage waveform and two capacitor side voltage waveforms, e.g. by the first, second and third voltage sensors 4a, 4b and 4c as in the figure.

The system 10 may also comprise a controller 5, e.g. for controlling the opening and closing of the switching device 1, by sending control signals 7 thereto, and/or for monitoring the grid-side and/or capacitor-side voltage waveforms, e.g. based on respective sensor signals 6a, 6b and/or 6c received from the voltage sensors 4a, 4b and/or 4c.

Figure 2:
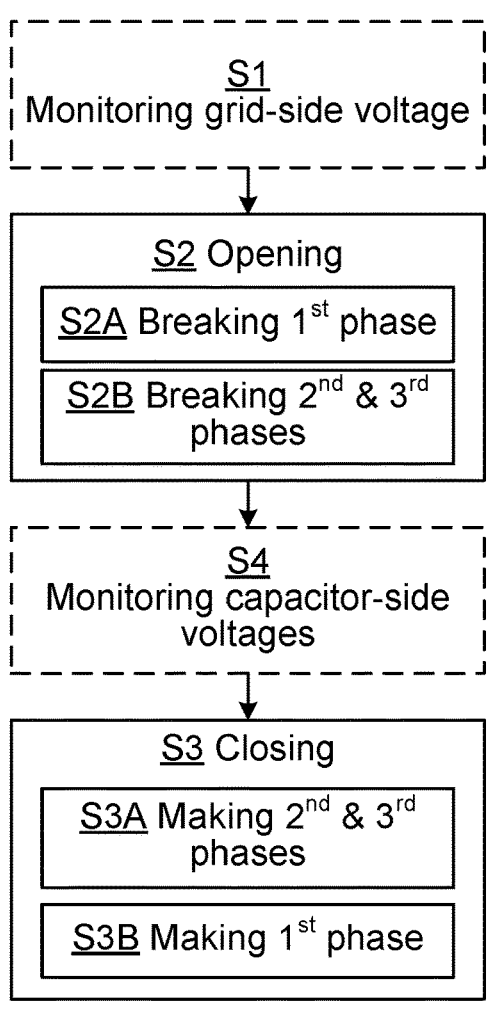
FIG. 2 is a schematic flow chart of the method in accordance with some embodiments of the present invention.

FIG. 2 illustrates some embodiments of the method of the present disclosure. The method is for reducing inrush current to an ungrounded capacitor bank 2 when re-closing a switching device 1 arranged between an AC voltage source 3 and the capacitor bank in an electrical three-phase system 10.

The method comprises opening S2 the switching device 1 in accordance with an opening sequence. The opening sequence comprises breaking S2A the current of a first phase R of the three phases of the three-phase system 10. Then, the opening sequence comprises, after a predetermined opening time period starting at the breaking S2A of the first phase R, simultaneously breaking S2B the current of a second phase S of the three phases and the current of a third phase T of the three phases. Thus, first the current of the first phase is broken, and then, after a predetermined period of time, respective currents of the second and third phases are broken simultaneously. In some embodiments of the present invention, the predetermined opening time period is 1/4 period or 1/4+m period of the voltage waveform, where m is an integer of at least zero, preferably zero. In other embodiments, the predetermined opening time period is 3/4 period or 3/4+m period of the voltage waveform. It may in many cases be preferred to use an opening time period of 1/4 period. For example, if the AC frequency of the system 10 is 50 Hz, 1/4 period is 5 milliseconds (ms).

Further, the method comprises re-closing S3 the switching device 1 in accordance with a closing sequence. The closing sequence comprises, simultaneously making S3A the respective currents of the second and third phases S and T, i.e. the two phases in which the current was broken last in the preceding opening S2. Then, the closing sequence comprises, after a predetermined closing time period starting at the making S3A of the second and third phases S and T, making S3B the current of the first phase R. Thus, the phase which was first broken during the preceding opening S2 is made last during the closing S3. In accordance with the present invention, the predetermined closing time period is specific and depends on the predetermined opening time period used when opening the switching device before the re-closing thereof. If the predetermined opening time period corresponds to a 1/4+m period, the predetermined closing time period corresponds to a 3/4+n period of the voltage waveform. If the predetermined opening time period corresponds to a 3/4+m period, the predetermined closing time period corresponds to a 1/4+n period of the voltage waveform. As with m, n is an integer of at least zero, preferably zero. For example, if the AC frequency of the system 10 is 50 Hz, 3/4 period is 15 ms.

In some embodiments of the present invention, the method comprises monitoring S1 the voltage waveform $U_R$, $U_S$ or $U_T$ of either of the three phases, and a phase angle thereof, between the switching device 1 and the voltage source 3, e.g. by means of the first voltage sensor 4a as discussed above. In some embodiments, the opening S2 may then be initiated in response to the monitored S1 phase angle reaching a predetermined opening angle. Additionally or alternatively, in some embodiments, the closing S3 may be initiated in response to the monitored S1 phase angle reaching a predetermined closing angle.

In some embodiments of the present invention, the making S3A of the second and third phases S and T occurs within a time period of 10 seconds, preferably of 1 second, from the breaking S2A of the first phase R. For instance, if the AC frequency of the system 10 is 50 Hz, 1 s corresponds to 50 periods. This implies that the capacitor bank 2 is still fully charged, or close thereto when the switching device 1 is re-closed S3. It may be desirable to consider the polarities of the phases when re-closing, especially when the capacitor bank 2 is still fully charged. Thus, in some embodiments when the predetermined opening time period corresponds to a 1/4+m period, the making S3A of the second and third phases S and T occurs at a positive zero-crossing in the voltage $U_R$ waveform of the first phase R if the breaking S2A of the first phase R occurred at the minimum in the voltage $U_R$ waveform of the first phase R, or at a negative zero-crossing in the voltage $U_R$ waveform of the first phase R if the breaking S2A of the first phase R occurred at the maximum in the voltage $U_R$ waveform of the first phase R. However, in some other embodiments when the predetermined opening time period corresponds to a 3/4+m period, the making S3A of the second and third phases S and T occurs at a negative zero-crossing in the voltage $U_R$ waveform of the first phase R if the breaking S2A of the first phase R occurred at the minimum in the voltage $U_R$ waveform of the first phase R, or at a positive zero-crossing in the voltage $U_R$ waveform of the first phase R if the breaking S2A of the first phase R occurred at the maximum in the voltage $U_R$ waveform of the first phase R.

In some other embodiments of the present invention, the making S3A of the second and third phases S and T occurs after a time period of at least 1 second, preferably of at least 10 seconds, from the breaking S2A of the first phase R, e.g. within a time range of 1 to 300 seconds, such as 10-250 seconds, from the breaking S2A of the first phase R. This implies that the capacitor bank 2 is partially charged/discharged at the time of re-closing the switching device 1. As mentioned above, it may then be advantageous to make S3A the respective currents of the second and third phases S and T when the voltage $U_S$-$U_{CS}$ across the switch 1b for the second phase S is the same as the voltage $U_T$-$U_{CT}$ across the switch 1c for the third phase T. In order to facilitate this, the method may in some embodiments comprise monitoring S4 the voltage waveform $U_{CS}$ of the second phase S and a voltage waveform $U_{CT}$ of the third phase T between the switching device 1 and the capacitor bank 2, i.e. capacitor-side voltages.

Figure 3:
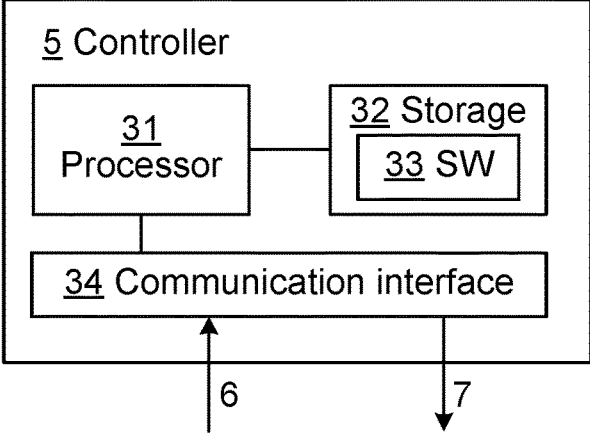
FIG. 3 is a schematic block diagram of a controller for a switching device, in accordance with some embodiments of the present invention.

FIG. 3 illustrates a controller 5 of the system 10. The controller 5 comprises processing circuitry 31 e.g. a central processing unit (CPU). The processing circuitry 31 may comprise one or a plurality of processing units in the form of microprocessor(s). However, other suitable devices with computing capabilities could be comprised in the processing circuitry 31, e.g. an application specific integrated circuit (ASIC), a field programmable gate array (FPGA) or a complex programmable logic device (CPLD). The processing circuitry 31 is configured to run one or several computer program(s) or software (SW) 33 stored in a storage 32 of one or several storage unit(s) e.g. a memory. The storage unit is regarded as a computer readable means 32, forming a computer program product together with the SW 33 stored thereon as computer-executable components and may e.g. be in the form of a Random Access Memory (RAM), a Flash memory or other solid state memory, or a hard disk, or be a combination thereof. The processing circuitry 31 may also be configured to store data in the storage 32, as needed. The controller 5 may also comprise a communication interface 34, e.g. for communicating with other parts of the system 10. The controller may e.g. send control signals 7 to the switching device 1 via the communication interface 34 and/or receive sensor signals 6 from the voltage sensor(s) 4.

Figure 4A:
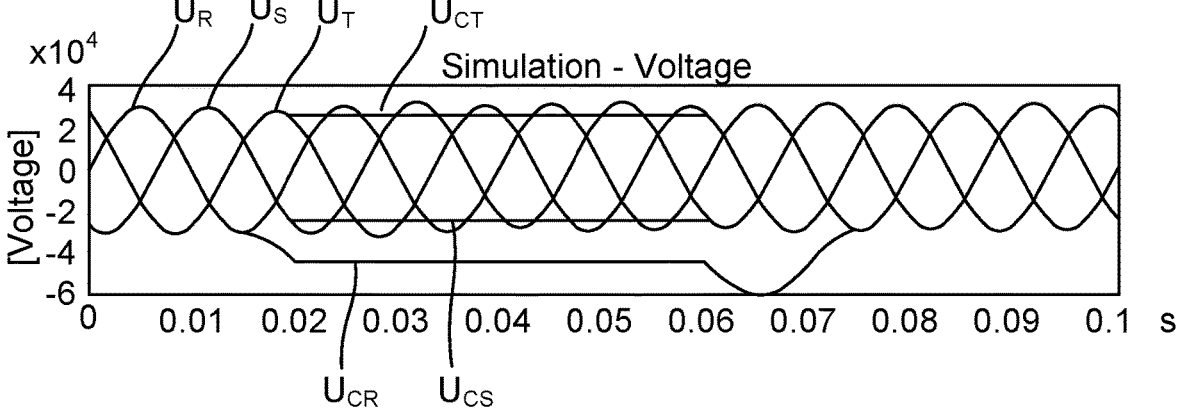
FIG. 4a is a schematic diagram of voltage waveforms as a function of time in the electrical three-phase system during opening and re-closing of the switching device, in accordance with some embodiments of the present invention.
Figure 4B:
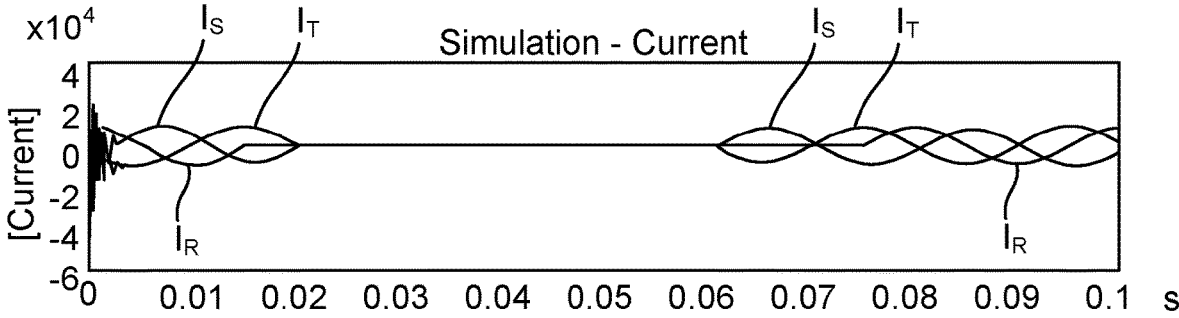
FIG. 4b is a schematic diagram of current waveforms as a function of time in the electrical three-phase system, corresponding to the voltage waveforms in FIG. 4a, in accordance with some embodiments of the present invention.

FIGS. 4*a* and 4*b* show simulated voltage and current waveforms, respectively during opening S2 and re-closing S3 of the switching device in a 50 Hz system 10. As can be seen, the current of the first phase R is broken at time 15 ms, and 5 ms later the currents of the second and third phases S and T are broken. Then, 45 ms after the breaking of the first phase current, the currents of the second and third phases S and T are made again, after which, 15 ms later, the current of the first phase R is made.

Figure 5A:
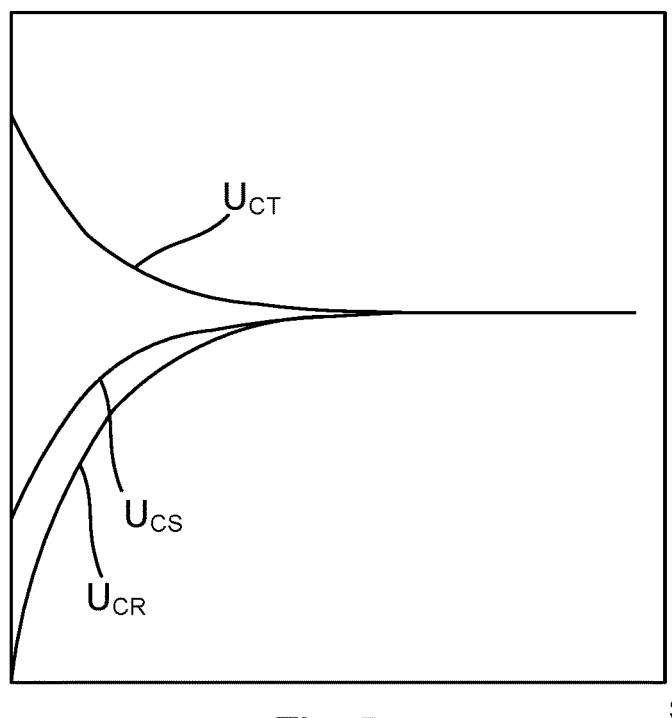
FIG. 5a is a schematic diagram of discharging of a capacitor bank after opening of the switching device, in accordance with some embodiments of the present invention.

FIG. 5*a* illustrates how the capacitor bank 2 may discharge over time after opening S2 of the switching device 1. The capacitor-side voltages converge on zero voltage, the capacitor bank 2 eventually becoming substantially fully discharged.

Figure 5B:
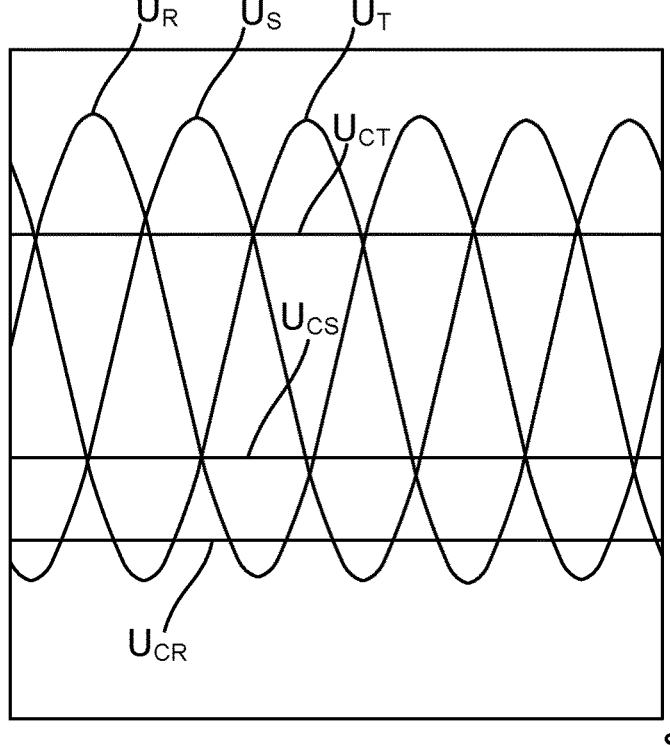
FIG. 5b is a schematic diagram of voltage waveforms as a function of time in the electrical three-phase system when the capacitor bank is partially discharged after opening of the switching device, in accordance with some embodiments of the present invention.

FIG. 5*b* illustrates an example of grid-side and capacitor-side voltage waveforms after opening S2 of the switching device 1 during a time period when the capacitor bank 2 is partially discharged.

Figure 6:
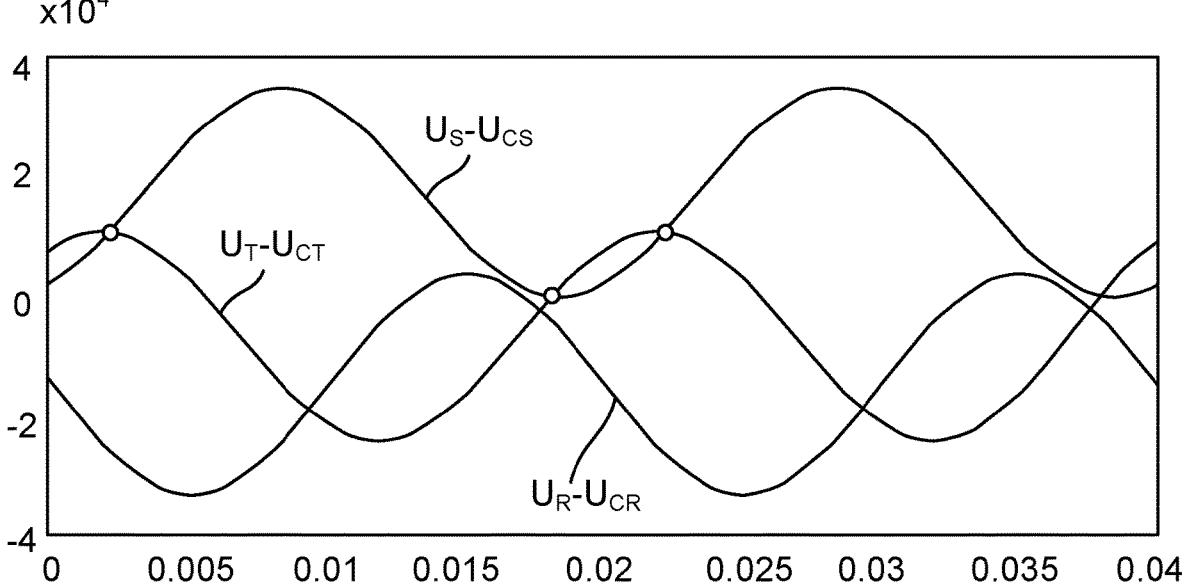
FIG. 6 is a schematic diagram of voltage waveforms as a function of time, of voltages across the switching device for each phase, in accordance with some embodiments of the present invention.

FIG. 6 illustrates an example of waveforms of respective voltages across each switch 1*a*, 1*b* and 1*c*. The voltage across the switch 1*a* of the first phase R is $U_R$-$U_{CR}$, the voltage across the switch 1*b* of the second phase S is $U_S$-$U_{CS}$ and the voltage across the switch 1*c* of the third phase T is $U_T$-$U_{CT}$. As mentioned above, according to some embodiments of the present invention, it may be advantageous to, during the closing S3 of the switching device 1, make S3A the respective currents of the second and third phases S and T when the voltage $U_S$-$U_{CS}$ across the switching device for the second phase S is the same as a voltage $U_T$-$U_{CT}$ across the switching device for the third phase T. Such instances are marked with a small circle in the diagram of FIG. 6.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method for reducing inrush current to an ungrounded capacitor bank when re-closing a switching device arranged between an AC voltage source and the capacitor bank in an electrical three-phase system, the method comprising:

opening the switching device, by an opening sequence including:

breaking the current of a first phase of the three phases, and after a predetermined opening time period starting at the breaking of the first phase, simultaneously breaking the current of a second phase of the three phases and the current of a third phase of the three phases; and following the opening, before the capacitor bank has fully discharged, closing the switching device, by a closing sequence including:

simultaneously making the respective currents of the second and third phases, and after a predetermined closing time period starting at the making of the second and third phases, making the current of the first phase;

wherein the predetermined opening time period corresponds to a 1/4+m period or a 3/4+m period of a voltage waveform of anyone of the three phases, where m is an integer of at least zero; and wherein, when the predetermined opening time period corresponds to a 1/4+m period, the predetermined closing time period corresponds to a 3/4+n period of the voltage waveform, and when the predetermined opening time period corresponds to a 3/4+m period, the predetermined closing time period corresponds to a 1/4+n period of the voltage waveform, where n is an integer of at least zero;

wherein, when the capacitor bank is fully charged, or close thereto, at the closing of the switching device:

when the predetermined opening time period corresponds to a 1/4+m period, the making of the second and third phases occurs at a positive zero-crossing in the voltage waveform of the first phase if the breaking of the first phase occurred at the minimum in the voltage waveform of the first phase, or at a negative zero-crossing in the voltage waveform of the first phase if the breaking of the first phase occurred at the maximum in the voltage waveform of the first phase, and when the predetermined opening time period corresponds to a 3/4+m period, the making of the second and third phases occurs at a negative zero-crossing in the voltage waveform of the first phase if the breaking of the first phase occurred at the minimum in the voltage waveform of the first phase, or at a positive zero-crossing in the voltage waveform of the first phase if the breaking of the first phase occurred at the maximum in the voltage waveform of the first phase; and when the capacitor bank is partially charged at the closing of the switching device, the method further comprises, between the switching device and the capacitor bank, monitoring a voltage waveform of the second phase and a voltage waveform of the third phase;

wherein the making of the second and third phases occurs when a voltage across the switching device for the second phase is the same as a voltage across the switching device for the third phase.

2. The method of claim 1, further comprising:

between the switching device and the voltage source, monitoring the voltage waveform, and a phase angle thereof.

3. The method of claim 2, wherein the opening is initiated in response to the monitored phase angle reaching a predetermined opening angle.

4. The method of claim 3, wherein the closing is initiated in response to the monitored phase angle reaching a predetermined closing angle.

5. The method of claim 2, wherein the closing is initiated in response to the monitored phase angle reaching a predetermined closing angle.

6. The method of claim 1, wherein the capacitor bank is fully charged, or close thereto, at the closing of the switching device when the making of the second and third phases occurs within a time period of 10 seconds from the breaking of the first phase.

7. The method of claim 6, wherein the making of the second and third phases occurs within 1 second from the breaking of the first phase.

8. The method of claim 1, wherein the capacitor bank is partially charged at the closing of the switching device when the making of the second and third phases occurs after a time period of at least 1 second from the breaking of the first phase.

9. The method of claim 8, wherein the making of the second and third phases occurs within a time range of 1 to 300 seconds from the breaking of the first phase.

10. The method of claim 8, wherein the making of the second and third phases occurs 10-250 seconds from the breaking of the first phase.

11. The method of claim 1, wherein m is zero and/or n is zero.

12. A computer program product comprising a non-transitory computer-readable storage medium and computer-executable components a stored in the storage medium, wherein the computer-executable components, which when run on processing circuitry of a controller, causes the controller to perform a method for reducing inrush current to an ungrounded capacitor bank when re-closing a switching device arranged between an AC voltage source and the capacitor bank in an electrical three-phase system, the method including:

opening the switching device, by an opening sequence including:

breaking the current of a first phase of the three phases, and after a predetermined opening time period starting at the breaking of the first phase, simultaneously breaking the current of a second phase of the three phases and the current of a third phase of the three phases; and following the opening, before the capacitor bank has fully discharged, closing the switching device, by a closing sequence including:

simultaneously making the respective currents of the second and third phases, and after a predetermined closing time period starting at the making of the second and third phases, making the current of the first phase;

wherein the predetermined opening time period corresponds to a 1/4+m period or a 3/4+m period of a voltage waveform of anyone of the three phases, where m is an integer of at least zero; and wherein, when the predetermined opening time period corresponds to a 1/4+m period, the predetermined closing time period corresponds to a 3/4+n period of the voltage waveform, and when the predetermined opening time period corresponds to a 3/4+m period, the predetermined closing time period corresponds to a 1/4+n period of the voltage waveform, where n is an integer of at least zero;

wherein, when the capacitor bank is fully charged, or close thereto, at the closing of the switching device:

when the predetermined opening time period corresponds to a 1/4+m period, the making of the second and third phases occurs at a positive zero-crossing in the voltage waveform of the first phase if the breaking of the first phase occurred at the minimum in the voltage waveform of the first phase, or at a negative zero-crossing in the voltage waveform of the first phase if the breaking of the first phase occurred at the maximum in the voltage waveform of the first phase, and when the predetermined opening time period corresponds to a 3/4+m period, the making of the second and third phases occurs at a negative zero-crossing in the voltage waveform of the first phase if the breaking of the first phase occurred at the minimum in the voltage waveform of the first phase, or at a positive zero-crossing in the voltage waveform of the first phase if the breaking of the first phase occurred at the maximum in the voltage waveform of the first phase; and when the capacitor bank is partially charged at the closing of the switching device, the method further comprises, between the switching device and the capacitor bank, monitoring a voltage waveform of the second phase and a voltage waveform of the third phase;

wherein the making of the second and third phases occurs when a voltage across the switching device for the second phase is the same as a voltage across the switching device for the third phase.

13. A controller for a switching device, the controller comprising:

processing circuitry; and storage storing instructions executable by said processing circuitry whereby said controller is operative to perform a method for reducing inrush current to an ungrounded capacitor bank when re-closing the switching device arranged between an AC voltage source and the capacitor bank in an electrical three-phase system, the method including:

opening the switching device, by an opening sequence including:

breaking the current of a first phase of the three phases, and after a predetermined opening time period starting at the breaking of the first phase, simultaneously breaking the current of a second phase of the three phases and the current of a third phase of the three phases; and following the opening, before the capacitor bank has fully discharged, closing the switching device, by a closing sequence including:

simultaneously making the respective currents of the second and third phases, and after a predetermined closing time period starting at the making of the second and third phases, making the current of the first phase;

wherein the predetermined opening time period corresponds to a 1/4+m period or a 3/4+m period of a voltage waveform of anyone of the three phases, where m is an integer of at least zero; and wherein, when the predetermined opening time period corresponds to a 1/4+m period, the predetermined closing time period corresponds to a 3/4+n period of the voltage waveform, and when the predetermined opening time period corresponds to a 3/4+m period, the predetermined closing time period corresponds to a 1/4+n period of the voltage waveform, where n is an integer of at least zero;

wherein, when the capacitor bank is fully charged, or close thereto, at the closing of the switching device:

when the predetermined opening time period corresponds to a 1/4+m period, the making of the second and third phases occurs at a positive zero-crossing in the voltage waveform of the first phase if the breaking of the first phase occurred at the minimum in the voltage waveform of the first phase, or at a negative zero-crossing in the voltage waveform of the first phase if the breaking of the first phase occurred at the maximum in the voltage waveform of the first phase, and when the predetermined opening time period corresponds to a 3/4+m period, the making of the second and third phases occurs at a negative zero-crossing in the voltage waveform of the first phase if the breaking of the first phase occurred at the minimum in the voltage waveform of the first phase, or at a positive zero-crossing in the voltage waveform of the first phase if the breaking of the first phase occurred at the maximum in the voltage waveform of the first phase; and when the capacitor bank is partially charged at the closing of the switching device, the method further comprises, between the switching device and capacitor bank, monitoring a voltage waveform of the second phase and a voltage waveform of the third phase;

wherein the making of the second and third phases occurs when a voltage across the switching device for the second phase is the same as a voltage across the switching device for the third phase.

14. An electrical three-phase system comprising:
a switching device;
an ungrounded capacitor bank; and
a controller for the switching device, the controller comprising:
processing circuitry; and
storage storing instructions executable by said processing circuitry whereby said controller is operative to perform a method for reducing inrush current to the ungrounded capacitor bank when re-closing the switching device arranged between an AC voltage source and the capacitor bank, the method including:
opening the switching device, by an opening sequence including:
breaking the current of a first phase of the three phases, and after a predetermined opening time period starting at the breaking of the first phase, simultaneously breaking the current of a second phase of the three phases and the current of a third phase of the three phases; and following the opening, before the capacitor bank has fully discharged, closing the switching device, by a closing sequence including:
simultaneously making the respective currents of the second and third phases, and
after a predetermined closing time period starting at the making of the second and third phases, making the current of the first phase;

wherein the predetermined opening time period corresponds to a 1/4+m period or a 3/4+m period of a voltage waveform of anyone of the three phases, where m is an integer of at least zero; and wherein, when the predetermined opening time period corresponds to a 1/4+m period, the predetermined closing time period corresponds to a 3/4+n period of the voltage waveform, and when the predetermined opening time period corresponds to a 3/4+m period, the predetermined closing time period corresponds to a 1/4+n period of the voltage waveform, where n is an integer of at least zero;

wherein, when the capacitor bank is fully charged, or close thereto, at the closing of the switching device:

when the predetermined opening time period corresponds to a 1/4+m period, the making of the second and third phases occurs at a positive zero-crossing in the voltage waveform of the first phase if the breaking of the first phase occurred at the minimum in the voltage waveform of the first phase, or at a negative zero-crossing in the voltage waveform of the first phase if the breaking of the first phase occurred at the maximum in the voltage waveform of the first phase, and when the predetermined opening time period corresponds to a 3/4+m period, the making of the second and third phases occurs at a negative in the voltage waveform of the first phase if the breaking of the first phase occurred at the minimum in the voltage waveform of the first phase, or at a positive zero-crossing in the voltage waveform of the first phase if the breaking of the first phase occurred at the maximum in the voltage waveform of the first phase; and when the capacitor bank is partially charged at the closing of the switching device, the method further comprises, between the switching device and the capacitor bank, monitoring a voltage waveform of the second phase and a voltage waveform of the third phase;

wherein the making of the second and third phases occurs when a voltage across the switching device for the second phase is the same as a voltage across the switching device for the third phase.

15. The electrical three-phase system of claim 14, wherein the capacitor bank has a star configuration.

16. The electrical three-phase system of claim 14, further comprising a first voltage sensor for monitoring the voltage waveform between the switching device and the voltage source.

17. The electrical three-phase system of claim 16, further comprising:

a second voltage sensor for monitoring of a voltage waveform of the second phase between the switching device and the capacitor bank; and a third voltage sensor for monitoring of a voltage waveform of the third phase between the switching device and the capacitor bank.

\* \* \* \* \*